United States Patent
Shafi et al.

(10) Patent No.: US 9,588,544 B2
(45) Date of Patent: Mar. 7, 2017

(54) TIME SYNCHRONIZATION ACROSS COMPUTERS IN A DISTRIBUTED SYSTEM

(75) Inventors: Hazim Shafi, Redmond, WA (US); Matthew L. Jacobs, Seattle, WA (US); Alexander Dadiomov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1017 days.

(21) Appl. No.: 13/153,742

(22) Filed: Jun. 6, 2011

(65) Prior Publication Data

US 2012/0311136 A1 Dec. 6, 2012

(51) Int. Cl.
| | |
|---|---|
| G06F 15/173 | (2006.01) |
| G06F 15/16 | (2006.01) |
| H04J 3/06 | (2006.01) |
| H04L 12/28 | (2006.01) |
| G06F 1/14 | (2006.01) |
| H04W 56/00 | (2009.01) |

(52) U.S. Cl.
CPC .............. *G06F 1/14* (2013.01); *H04W 56/00* (2013.01)

(58) Field of Classification Search
CPC .... G06F 1/10; G06F 1/12; G06F 1/14; H04W 56/00; H04W 56/001; H04W 56/002
USPC .......................... 709/224, 248; 370/397, 350
See application file for complete search history.

(56) References Cited

U.S. PATENT DOCUMENTS

| | | | | |
|---|---|---|---|---|
| 5,566,180 | A * | 10/1996 | Eidson et al. ................ | 370/473 |
| 6,157,957 | A * | 12/2000 | Berthaud ...................... | 709/248 |
| 2005/0036254 | A1* | 2/2005 | Premerlani et al. ........... | 361/69 |
| 2005/0195772 | A1* | 9/2005 | Nishikawa et al. .......... | 370/337 |
| 2011/0268097 | A1* | 11/2011 | Agrawala ............... | G01S 5/021 370/338 |
| 2012/0179404 | A1* | 7/2012 | Lee et al. ....................... | 702/66 |

* cited by examiner

*Primary Examiner* — Tonia L Dollinger
*Assistant Examiner* — Adam Cooney
(74) *Attorney, Agent, or Firm* — Kevin Sullivan; Kate Drakos; Micky Minhas

(57) ABSTRACT

Normalizing time across machines in a distributed system. A method includes obtaining one or more points defining differences in time between machines in the distributed system. Using the points, a determination of one or more time measurement drifts between machines is made. The one or more time measurement drifts indicate changing differences in time over time. One or more traces are collected. Each trace includes one or more events. Each event is correlated to a time stamp from one of the machines in the distributed system. Using the one or more determined time measurement drifts, the time stamps are normalized.

20 Claims, 5 Drawing Sheets

TIME SYNCHRONIZATION ACROSS COMPUTERS IN A DISTRIBUTED SYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems. Computers can be connected together in a multi-machine configuration, such as a cluster, so that the multiple machines can work together to accomplish a set of given computing tasks.

It may be useful in a multi-machine scenario to observe messages between the different machines or to observe data processing on one or more machines. This may be done for performance analysis, debugging, profiling or other purposes. In multi-machine scenarios, software performance visualization and other analysis and/or investigation tools present together data collected from different machines. For example, traces may be captured among the various machines and then compared in a unified way, such that traces (and in particular events) from one machine are compared to, or in context with traces from another machine. The traces may include several events, each event associated with a time stamp assigned by the machine capturing a given trace. However, each machine measures time separately, and these time stamps are not automatically synchronized because each computer has its own clock frequency and offset. It is relatively easy to correlate all clocks if the exact values of frequencies and offsets are available, but in some significant scenarios these frequency values are expressed without enough precision or with slight inaccuracies, which prevents precise interpretation of the data coming from different machines with respect to each other.

To reason about the performance of an application running on a cluster of machines, it is often advantageous to synchronize time across the cluster. This allows correct analysis of time-dependent events such as message latency when machines communicate in a distributed system. Each machine in a distributed system reports time using its own internal clock, and such clocks might not all be running at the same frequency. Further, clock frequencies can change over time due to various environmental effects such as ambient temperature.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a distributed system computing environment. The method includes acts for normalizing time across machines in the distributed system. The method includes obtaining one or more points defining differences in time between machines in the distributed system. Using the points, a determination of one or more time measurement drifts between machines is made. The one or more time measurement drifts indicate changing differences in time stamps over time. One or more traces are collected. Each trace includes one or more events. Each event is correlated to a time stamp from one of the machines in the distributed system. Using the one or more determined time measurement offsets and drifts, the time stamps are normalized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may be configured to synchronize clocks between different computers with sufficient precision, even when the exact values of the individual clock frequencies are unknown. In some embodiments, it can be assumed that over a reasonably limited period of time that these clock frequencies are constant in time, their values are just not reported with enough precision or reported with errors.

Embodiments may perform a plurality of separate ping-pong type measurements, as described below, with enough time between the separate ping-pong type measurements, so that a linear interpolation (or in some embodiments as illustrated below, curvilinear interpolation) of their data will be sufficient to estimate the pair of frequencies and offsets with enough precision to synchronize data from different computers with a desired precision.

One synchronization algorithm illustrated herein relies on using two or more sets of ping-pong message latency measurements performed within a known period of time as measured on a reference system. Each message is associated with a sender and/or recipient timestamp. In particular, the sender remembers the timestamp when it sends the message, the receiver puts a timestamp in the message before returning it back, and the sender notes time upon message return. This allows embodiments to compensate for message latency as well as compute a timestamp offset. By gathering statistics on a set of these messages, a relatively accurate time offset between two systems can be measured. Inasmuch as clocks drift, another set of measurements is performed and embodiments compare the resulting offsets against the previous set to compute an approximate linear drift factor (using two sets of ping-pong messages) or curvilinear drift factor (using more than two sets of ping-pong messages). By knowing these two pieces of information for systems in a cluster, namely the offset and drift factor (which in many cases will represent an offset constant and a drift slope), embodiments can then adjust timestamp information in traces to minimize the error in measurements. In alternative embodiments, performance traces can be collected within a limited period of time where the drift causes negligible error. This limited period of time can be determined directly from the drift factor. Additional details are now illustrated.

Figure 1:
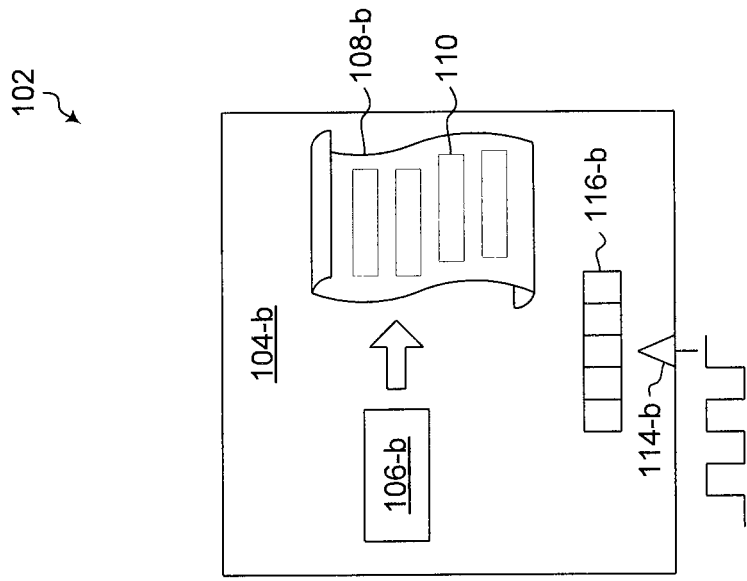
FIG. 1 illustrates conceptual machines in a multi-machine scenario.
Figure 1:
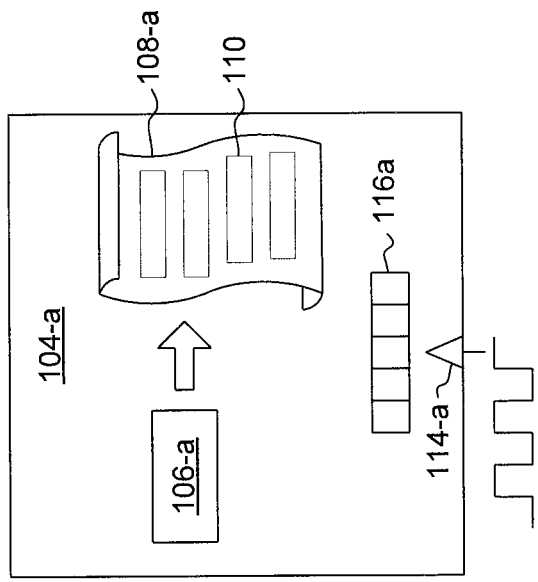

Referring now to FIG. 1, a simple computing cluster 102 is illustrated. In this example, the computing cluster 102 includes two machines, machine 104-a and 104-b (machines may be referred to herein generally as 104). Machines as used herein may comprise any one of a number of different entities. For example, a machine may be a node in a multi-machine cluster. A machine may be a network switch or other network device. A machine may be a virtual machine. Although not listed here, various other entities may function as machines as contemplated by the embodiments described herein.

Data capturing tools 106-a and 106-b (data capturing tools may be referred to herein generally as 106) may be run on the different machines to capture data traces 108-a and 108-b (data traces may be referred to herein generally as 108). The data traces each include one or more events 110, where each event is time stamped. The events 110 are typically time stamped by the machine capturing the event, which is often the machine on which data is being collected.

The traces 108 can be analyzed by analysis and visualization tools. The analysis and visualization tools for investigating multi-machine scenarios, deal with events 110 on multiple machines and their interplay. Hence they are highly dependent on the correct understanding of absolute event timing across machines. But each machine 104 has its own time measurement mechanism. FIG. 1 illustrates that each of the machines 104-a and 104-b includes a clock 114-a and 114-b (referred to herein generally as 114) respectively, which perform the function of the time measurement mechanism. These clocks 114 are not synchronized. The counters are independent of each other. The time stamps reported in events 110 may be read from a current value of the counters on the respective machines. Therefore, analysis tools rely on correct aligning of the data gathered from different clocks.

To align data, time stamps applied to events 110 are used. When collecting data in traces 108 for subsequent analysis, a machine's high-resolution counter 116-a and 116-b (for simplicity called below just a counter and referred to herein generally as 116) is used to timestamp events 110. There is no correlation between counter 116 values on different machines. The purpose of the clock synchronization is to convert timestamps from different local clocks into some unified "global time", which usually is just a time derived from the clock of one selected machine. After this conversion, timestamps can be compared meaningfully. For example, a user can say that the event A on computer 104-a happened before event B on computer 104-b.

Each machine clock 114 is exposed locally using the "high-performance counter 116", which increments its value at some hardware-defined frequency of the clock 114 and can be queried for its count at any time such as for example by a query counter operation. Another query frequency" operation returns the hardware frequency (number that the counter 116 increments per second). While actual clock frequencies may change slightly due to environmental or other conditions, this system reported frequency typically does not change. Because the counter starts at 0 on system boot and each system boots at a different time, any individual counter 116 value, without some context, is meaningless. However, the intervals between counter 116 values have a meaning. For example, to measure in seconds the time it takes to perform some action, one could query the counter 116, perform the action, query the counter 116 again, then take the difference of the counter 116 values, query the frequency, and finally divide the counters difference by the frequency.

In many cases, the described above straightforward use of the counter 116 and frequency is "good enough", but if the analysis or visualizations deal with the level of microseconds or nanoseconds, the maximal allowable error is very limited. For example, a visualization may show some action periods to a user on some timeline. In this example, the error cannot be more than the length of any given action. Otherwise the action start may be shown to the user after the same action's end. To correctly analyze or visualize scenarios including message passing across very fast networks (having latency of a microsecond or so), microsecond accuracy is needed—roughly the same as the network latency. Otherwise the tool may show a message arriving before it was sent. If the actual frequency of a clock is different from the reported frequency by even a small fraction, then time measurements will appear to drift from another clock. Even the drift of a few counts per second can cause multi-microsecond errors in the comparison of times between different clocks.

The following illustrates a numerical example. The reported frequency is $f_r$=2597656 counts/sec, while the true frequency is $f_t$=2597657 counts/sec. While this seems like a small difference, if the reported frequency is used to convert counters to seconds, in 2 minutes, 120 "extra" counts will be accumulated, which translates to 120*1,000,000/2597657=46 microseconds. If a network-related action were to take only 2 microseconds, the tool results would present gross inaccuracies without further correction.

A clock synchronization can produce reasonable results reliably even when the frequency is known only roughly. In some embodiments, two synchronization points sufficiently far apart can be used to determine a drift factor, which in some embodiments, may be a slope.

Figure 2:
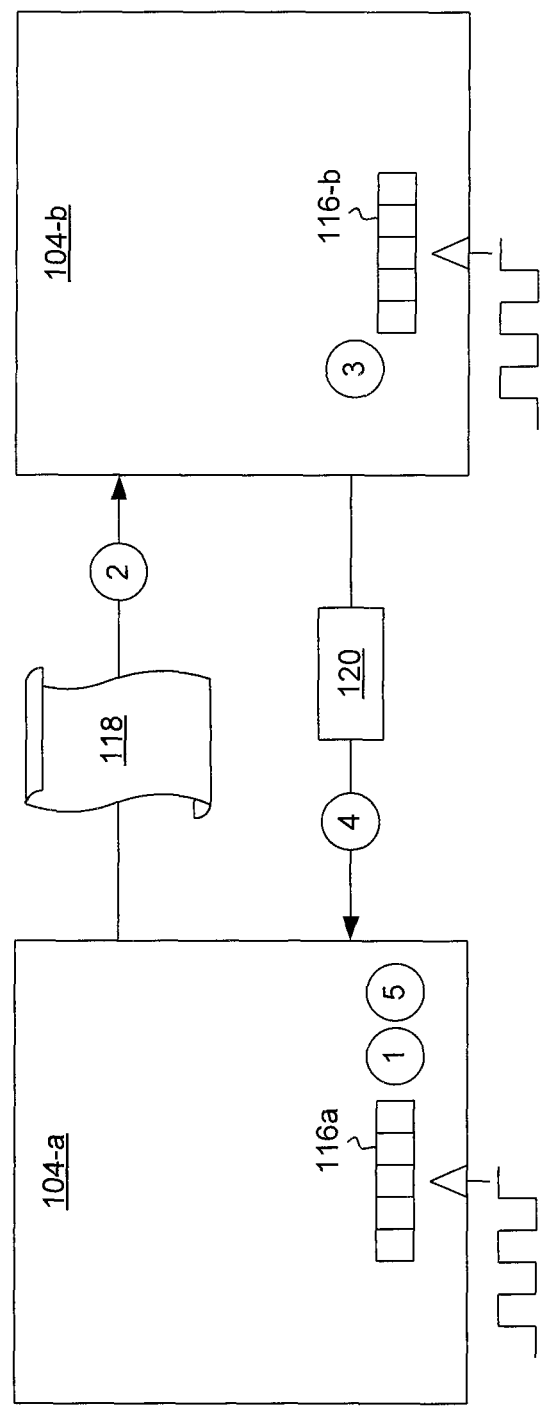
FIG. 2 illustrates another example of conceptual machines in a multi-machine scenario.

Each of the individual synchronization points is done by a "ping-pong" procedure. Such a procedure is illustrated with respect to FIG. 2. As illustrated at step 1, a machine 104-a queries local counter 116-a (a1), a local frequency (fa), and computes local timestamp $ta_1=a_1/fa$.

As illustrated at step 2, the machine 104-a sends a request 118 to the machine 104-b. As illustrated at step 3, the machine 104-b receives the request from machine 104-a, queries local counter 116-b (b), a local frequency (fb), and computes local timestamp tb=b/fb, and sends the local timestamp 120 back to machine 104-a. As illustrated at step 4, machine 104-a receives timestamp tb 120 from machine 104-b. As illustrated at step 5, machine 104-a queries local counter 116-a (a2), and computes a local timestamp $ta_2=a_2/fa$. Steps 6-12 are not shown in the Figures. At step 6, machine 104-a computes $L=(ta_2-ta_1)/2$, a mid-point between sending the request 118 and receiving the reply (i.e. timestamp 120), and an offset $Offset1=ta_2-tb-L$, which is an estimate of the clock offsets on machine 104-a versus machine 104-b.

At step 7, machine 104-a repeats steps 1 through 6 a statistically significant number of times. This may vary depending on the type of statistical analysis used. However, in some embodiments, about 100 samples may be sufficient.

At a step 8 machine 104-a takes the statistical mode of Offset1 of the samples to approximate a clock offset between machines 104-a and 104-b. Machine 104-a may also records T1=value of the counter 116-a on machine 104-a during sampling procedure steps 1-6. Some embodiments may use the statistical mode because for the typical well-behaved networks the distribution of the measurements is heavily concentrated around one point with several very obvious anomalies. In such embodiments, if the average is used instead of the mode, the estimate may be skewed by these anomalies.

The result of the "ping-pong" procedure includes two values. Namely Offset1 (which is an estimate of the difference between the local counters 116-a and 116-b on machines 104-a and 104-b), and T1 (which is the time of the ping-pong procedure, as estimated from machine 104-a's clock).

If the frequencies of machines 104-a and 104-b were exactly the same, Offset1 would be all that is needed to synchronize clocks. Unfortunately, in most cases, hardware (even of the same specification) is not totally identical on both sides, and frequencies slightly differ. As discussed above, this cannot typically be observed using a "query frequency" operation, which may be expressed too coarsely to reveal the difference. The following additional steps can be performed to obtain a drift factor. At step 9, embodiments may wait. In particular, embodiments should wait for a sufficient amount of time. A sufficient amount of time is an amount of time such that drift can be measured. For example, if the drift 0.01 counts per microsecond, and the clock has a frequency of 1 count per microsecond, a wait time of at least 100 microsecond (or 100 clock cycles) would be needed to detect even a single extra count. Thus, in this particular example, it may be prudent to wait a minimum of 1 ms, 10 ms, or even several minutes to ensure that enough counts have accumulated to be measurable. The wait time may be many times more than the whole time it took to execute steps 1-8. In particular, measurements taken in steps 1-8 in some embodiments are automatic and may happen within a fraction of a second. The wait time may be several minutes, depending on the necessary precision. It is possible to see from the results whether the interval was enough: do several more series of measurements 1-11, and make sure that the resulting values remain stable.

At step 10, steps 1-8 are repeated again, with the result being an offset Offset2 and the time to perform the second round of ping-pong messages T2.

At step 11, the "offset drift" (rate of change of the clock offset) between machine 104-a and machine 104-b is computed: $OffsetDrift=(Offset2-Offset1)/(T2-T1)$. To validate that this calculation is reliable, embodiments can do several more series of measurements using steps 1-11. This can also be done to make sure that the resulting values remain stable. Additionally, by repeating steps 1-10 several times and performing various curve fitting procedures, a non-linear offset drift can be computed and/or modeled if the drift exhibits any non-linearity.

Figure 4:
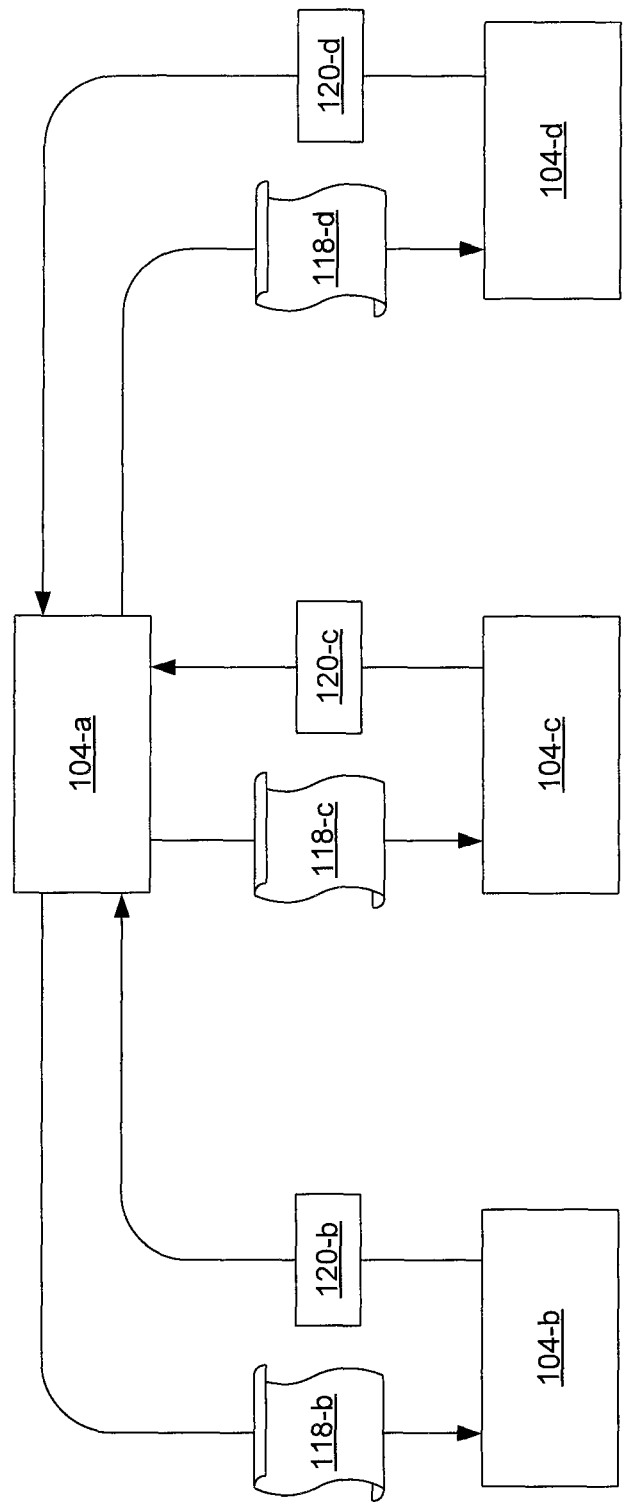
FIG. 4 illustrates another example of machines in a multi-machine scenario.

At a step 12, timestamps from machine 104-b can be converted.: For each input timestamp to convert, called "RawTimestamp", $ConvertedTimestamp=RawTimestamp-(OffsetDrift*(RawTimeStamp-T1)+Offset1)$ If there are more than two machines to be synchronized, some embodiments may select one machine as an anchor. The procedure described above can be executed between this machine and every other machine. All timestamps can be converted into the anchor's time. An example is illustrated in FIG. 4. FIG. 4 illustrates a plurality of machines 104-a, 104-b, 104-c, and 104-d. Machine 104-a may be selected as the anchor machine. Machine 104-a will perform the two or more ping-pong series exchanges as described above with each of the other machines 104-b, 104-c, and 104-d as illustrated in FIG. 4 by the requests 118-b, 118-c, and 118-d and the timestamps 120-b, 120-c, and 120-d.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
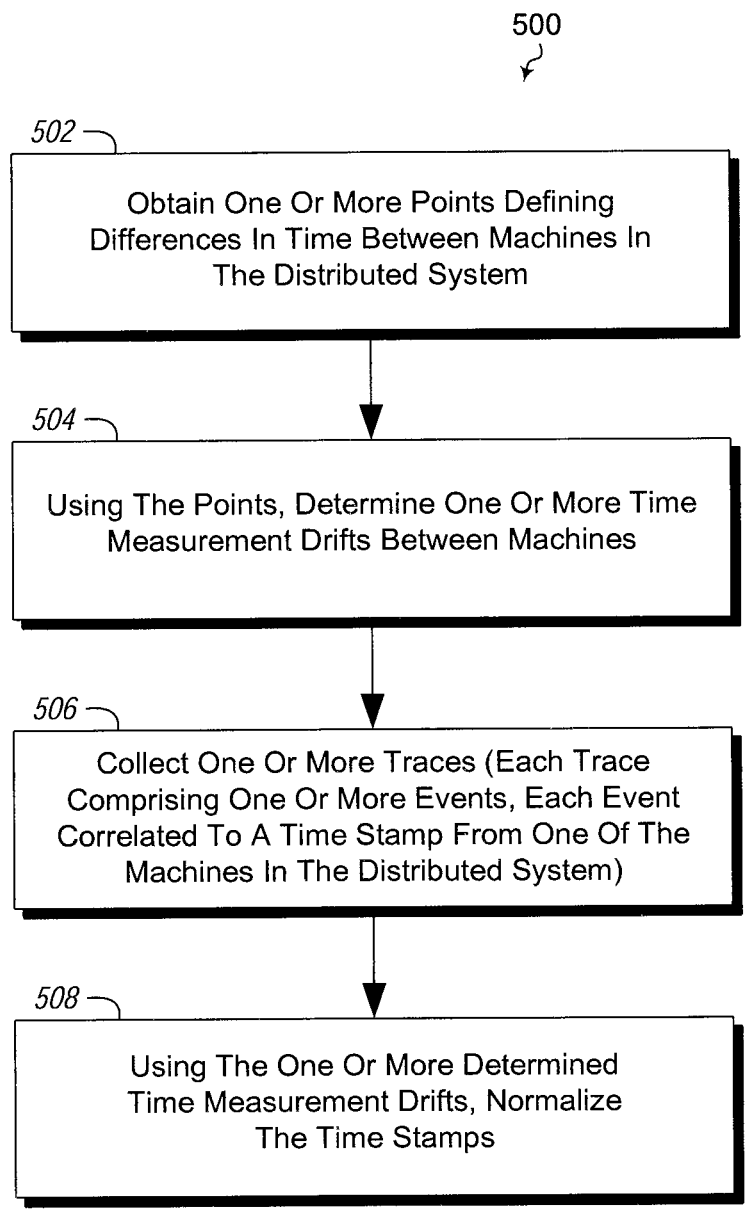
FIG. 5 illustrates a method of normalizing clocks in a multi-machine environment.

Referring now to FIG. 5, a method 500 is illustrated. The method 500 may be practiced in a distributed system computing environment. The method 500 includes acts for normalizing time across machines in the distributed system. The method includes obtaining two or more points defining differences in time between machines in the distributed system (act 502). For example, as illustrated above, a number of ping-pong exchanges may be used to obtain a plurality of offset measurements.

The method 500 further includes using the points, determining one or more time measurement drifts between machines (act 504). The one or more time measurement drifts indicate changing differences in time over time. For example, as illustrated above, a simple linear offset drift may be defined by taking the difference of two offset measurements over time to determine the offset drift.

The method 500 further includes collecting one or more traces (act 506). Each trace comprises one or more events. Each event is correlated to a time stamp from one of the machines in the distributed system. As described above, the time stamps are typically correlated to traces and events on the machine where the traces and events are generated and collected, such as an anchor machine as described above. For example as illustrated in FIG. 1, machine 104-b will collect traces (such as trace 108-b) of data produced by the machine 104-b. The machine 104-b will timestamp events 110 using the clock counter 116-b.

The method 500 further includes using the one or more determined time measurement drifts, normalizing the time stamps (act 508). Normalizing may include one or more of a number of different activities as explained in more detail below.

Figure 3:
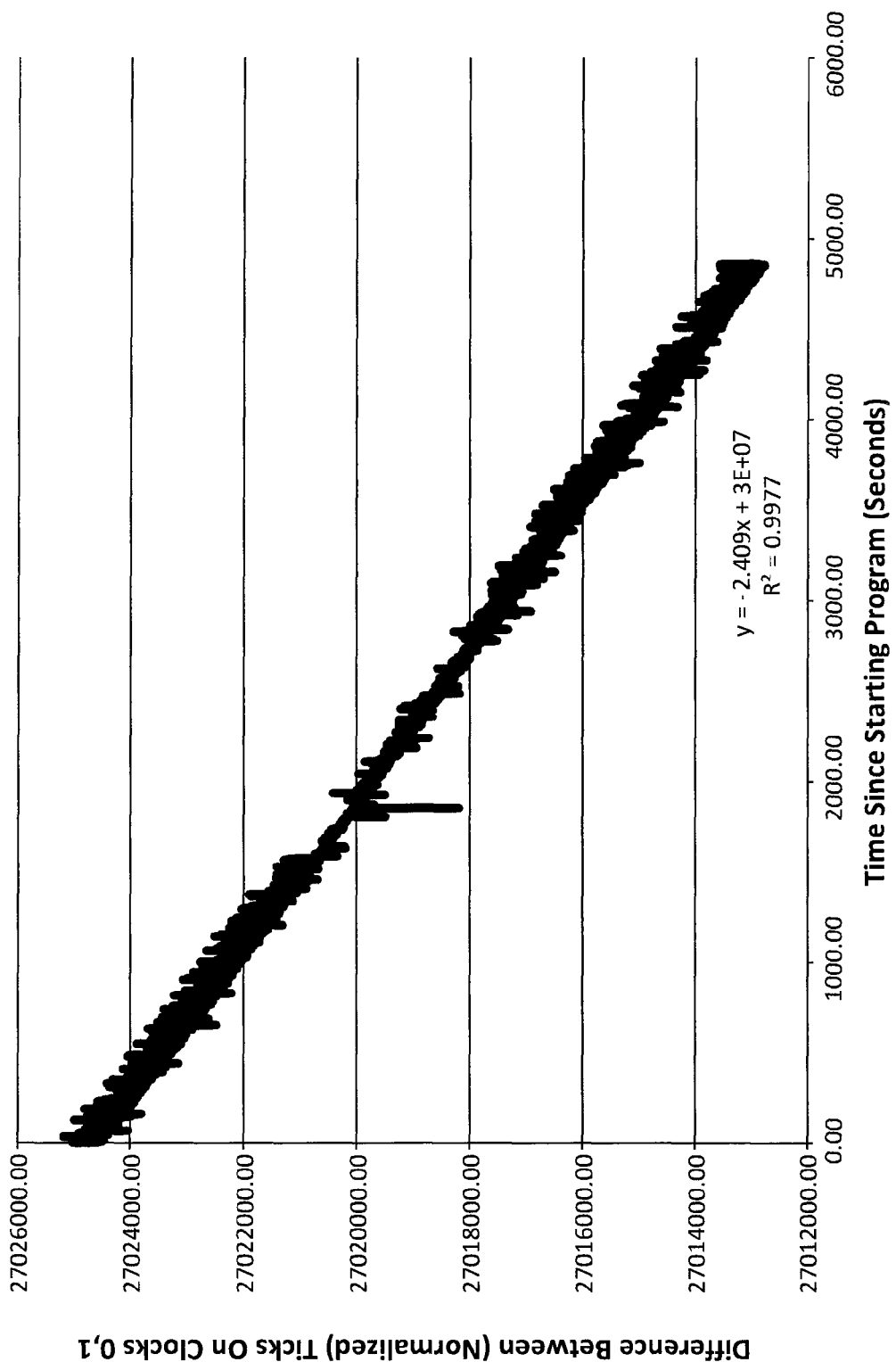
FIG. 3 illustrates a statistical view of clock drift over time.

Some embodiments of the method 500 may be practiced where obtaining one or more points defining differences in time between machines in the distributed system comprises statistical observation of time differences to determine a point. In particular, as described above, embodiments may be practiced where the ping-pong exchange is performed a number of times to obtain a number of sample points. Step 7 described above illustrates this functionality. As noted, in some embodiments, a given point may be defined by a statistical mode. FIG. 3, illustrates a chart of clock differences over time.

Some embodiments of the method 500 may be practiced where obtaining one or more points defining differences in time between machines in the distributed system comprises obtaining a plurality of points defining differences in time between a plurality of machines with respect to a single central machine. Some such embodiments may be practiced where obtaining one or more points defining differences in time between machines in the distributed system comprises the single central machine performs a ping pong message exchange with each machine in the plurality of machines to determine a difference in time between each of the machines in the plurality of machines and the single central machine. For example, FIG. 4 illustrates an example where machine 104-a is used as a central anchor machine to perform ping-pong exchanges with other machines to define different points.

Some embodiments of the method 500 may be practiced where obtaining one or more points defining differences in time between machines in the distributed system comprises determining one or more points by determining one or more time differences before collecting traces and determining one or more time differences after collecting traces. For example, a ping-pong exchange may be performed, traces (such as traces 108-a and 108-b illustrated in FIG. 1) may be collected, followed by another ping-pong exchange after traces are collected. In some examples of this embodiment, determining one or more time measurement drifts between machines comprises determining the difference between a first point collected before collecting a trace and a second point collected after collecting a trace and dividing the difference by the amount of time between the first point and the second point. In some embodiments, this may be approximated by the amount of time to collect the trace or the length of time of the trace.

As noted, normalizing may be performed in a number of different fashions. For example, in some embodiments normalizing may simply include collecting traces within a limited amount of time such that drift does not affect the trace collection and analysis. For example, some embodiments of the method 500 may be practiced where normalizing the time stamps includes determining an upper bound of allowable time difference error, and performing the act of collecting one or more traces by limiting a period of time in which the traces are collected to an amount of time where the one or more time measurement drifts over the period of time is less than the upper bound of allowable time difference error. For example, if it takes 1 ms for the drift to cause an additional clock count, then traces can be collected for up to 0.5 ms to ensure that the drift will not cause an error. In some embodiments, this can be done by collecting information at the beginning and end of a trace which gives initial offsets and drifts between machines. Embodiments can then determine what accuracy is needed, which in some embodiments is determined by the latency of the network. Embodiments can then either apply the drift factor ad hoc, or periodically to ensure that accuracy limits are not exceeded.

Some embodiments of the method 500 may be practiced where normalizing the time stamps comprises changing time stamps. For example, time stamps may be changed to remove or add clock counts based on a determination, using a drift factor, of a number of clock counts gained or lost respectively with respect to a centralized or anchor clock and a centralized or anchor machine.

Some embodiments of the method 500 may be practiced where determining one or more time measurement drifts between machines comprises determining one or more slopes. In particular, by performing two ping-pong exchanges as described above, a slope can be determined where the two points represent two points on a sloped line. In some embodiments, the method 500 may be practiced where determining one or more time measurement drifts between machines comprises approximating one or more slopes. In particular, there may be sufficient data to indicate that the drift is something other than a straight line. However, a linear slope can be approximated using two points on the non-linear drift. In some embodiments, this may be done by using points of a non-linear curve that are nearly or approximately linear.

Some embodiments of the method 500 may be practiced where determining one or more time measurement drifts between machines comprises determining one or more curves. In particular, by collecting three or more points, in some embodiments, it can be determined that the drift is non-linear. Using curve fitting algorithms, or other methods, the drift can be described in a non-linear fashion.

Some embodiments of the method 500 may be practiced to further include determining one or more periods between one or more points needed to measure time measurement drifts. In particular, if ping-pong exchanges are not performed sufficiently far apart, then an error may not be able to be detected. For example, if the a clock period is 1 ms and the drift is 0.01 ms, then 100 ms or 100 clock cycles are needed to detect a single error. However, as described above, it may be useful to have numerous errors accumulate to obtain better precision in determining the actual drift. Thus, embodiments may determine a suitable amount of time between ping-pong exchanges to ensure accuracy in drift determination. Some embodiments may experimentally determine periods for certain network technologies and/or topologies and use the periods in various in-practice environments.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed system computing environment, a method of normalizing timestamps arising from clocks in a plurality of machines in the distributed system, the method comprising:
   obtaining one or more points defining differences in time between machines in the distributed system, the obtaining one or more points defining differences in time including:
   determining a plurality of offset measurements, each determined by:
      a first computing system (CS1) determining a first local timestamp (LT1) by determining a local counter (a1), a local frequency (fa), and computing LT1=a1/fa,
      the CS1 sending a query to a second computing system (CS2),
      the CS1 receiving a response from the CS2 which includes a timestamp from the CS2 (T1),
      the CS1 determining a second local timestamp (LT2) for the receipt of the response,
      determining a latency from the LT1 and LT2, and
      determining an offset measurement for the CS1 and CS2 using the latency, the LT1, and the T1; and
   determining an offset for CS1 and CS2 by calculating the statistical mode of the plurality of offset measurements;
   calculating a ratio using the offset (O1), at least one later determined offset (O2), and an elapsed time (ET) between the offset and the at least one later determined offset to determine one or more time measurement drifts between machines, the one or more time measurement drifts measuring the rate of change of a local clock in CS1 relative to the rate of change in another local clock in CS2 and being determined by the ratio (O2−O1)/ET;
   determining whether the calculated time measurement drifts are stable by comparing one or more additional calculated time measurement drifts;
   collecting one or more events, each event correlated to a time stamp from one of the machines in the distributed system; and
   using the offset and the one or more determined time measurement drifts, normalizing the time stamps of the one or more events.

2. The method of claim 1, wherein obtaining one or more points defining differences in time between machines in the distributed system comprises statistical observation of time differences to determine a point.

3. The method of claim 1, wherein normalizing the time stamps comprises:
   determining an upper bound of allowable time difference error; and
   performing the act of collecting one or more traces by limiting a period of time in which the traces are collected to an amount of time where the one or more time measurement drifts over the period of time is less than the upper bound of allowable time difference error.

4. The method of claim 1, wherein normalizing the time stamps comprises changing time stamps.

5. The method of claim 1, wherein determining one or more time measurement drifts between machines comprises determining one or more slopes.

6. The method of claim 1, wherein determining one or more time measurement drifts between machines comprises approximating one or more slopes.

7. The method of claim 1, wherein determining one or more time measurement drifts between machines comprises determining one or more curves.

8. The method of claim 1, wherein obtaining one or more points defining differences in time between machines in the distributed system comprises obtaining a plurality of points defining differences in time between a plurality of machines with respect to a single central machine.

9. The method of claim 8, wherein obtaining one or more points defining differences in time between machines in the distributed system comprises the single central machine performs a ping pong message exchange with each machine in the plurality of machines to determine a difference in time between each of the machines in the plurality of machines and the single central machine.

10. The method of claim 1, wherein obtaining one or more points defining differences in time between machines in the distributed system comprises determining one or more points by determining one or more time differences before collecting traces and determining one or more time differences after collecting traces, and wherein determining one or more time measurement drifts between machines comprises determining the difference between a first point collected before collecting a trace and a second point collected after collecting a trace and dividing the difference by the amount of time between the first point and the second point.

11. The method of claim 1, further comprising determining one or more periods between one or more points needed to measure time measurement drifts.

12. In a computing environment, a computer program product comprising one or more physical storage devices having encoded thereon computer executable instructions that when executed by one or more processors in a computing system cause the system to perform a method for timestamps arising from clocks in a plurality of machines in a distributed system, the method comprising:
  obtaining one or more points defining differences in time between machines in the distributed system, the obtaining one or more points defining differences in time including:
  determining a plurality of offset measurements, each determined by:
    a first computing system (CS1) determining a first local timestamp (LT1) by determining a local counter (a1), a local frequency (fa), and computing LT1=a1/fa,
    the CS1 sending a query to a second computing system (CS2),
    the CS1 receiving a response from the CS2 which includes a timestamp from the CS2 (T1),
    the CS1 determining a second local timestamp (LT2) for the receipt of the response,
    determining a latency from the LT1 and LT2, and
    determining an offset measurement for the CS1 and CS2 using the latency, the LT1, and the T1; and
  determining an offset for CS1 and CS2 by calculating the statistical mode of the plurality of offset measurements;
  calculating a ratio using the offset (O1), at least one later determined offset ( O2), and an elapsed time (ET) between the offset and the at least one later determined offset to determine one or more time measurement drifts between machines, the one or more time measurement drifts measuring the rate of change of a local clock in CS1 relative to the rate of change in another local clock in CS2 and being determined by the ratio (O2−O1)/ET;

determining whether the calculated time measurement drifts are stable by comparing one or more additional calculated time measurement drifts;
collecting one or more events, each event correlated to a time stamp from one of the machines in the distributed system; and
using the offset and the one or more determined time measurement drifts, normalizing the time stamps of the one or more events.

13. The computer program product of claim 12, wherein obtaining one or more points defining differences in time between machines in the distributed system comprises statistical observation of time differences to determine a point.

14. The computer program product of claim 12, wherein normalizing the time stamps comprises:
  determining an upper bound of allowable time difference error; and
  performing the act of collecting one or more traces by limiting a period of time in which the traces are collected to an amount of time where the one or more time measurement drifts over the period of time is less than the upper bound of allowable time difference error.

15. The computer program product of claim 12, wherein normalizing the time stamps comprises changing time stamps.

16. The computer program product of claim 12, wherein determining one or more time measurement drifts between machines comprises determining one or more slopes.

17. The computer program product of claim 12, wherein determining one or more time measurement drifts between machines comprises approximating one or more slopes.

18. The computer program product of claim 12, wherein determining one or more time measurement drifts between machines comprises determining one or more curves.

19. The computer program product of claim 12, wherein the obtaining one or more points defining differences in time between machines in the distributed system comprises obtaining a plurality of points defining differences in time between a plurality of machines with respect to a single central machine.

20. In a computing environment, a system for normalizing timestamps arising in a plurality of clocks in a distributed system, the system comprising:
  a plurality of machines, each machine comprising:
    time measurement mechanism, wherein each time measurement mechanism reports a frequency;
    a data gather tool configured to gather traces, wherein each trace comprises one or more events, each event correlated to a time stamp assigned by the time measurement mechanism; and
  wherein one of the machines from among the plurality of machines is configured to detect time measurement drifts as a result of errors in actual frequencies of the time measurement mechanisms versus reported frequencies of the time measurement mechanisms and to normalize time stamps by:
    obtaining one or more points defining differences in time between machines in the plurality of machines through a ping-pong message exchange, the obtaining one or more points defining differences in time including:
      determining a plurality of offset measurements, each determined by:
        a first computing system (CS1) determining a first local timestamp (LT1) by determining a local counter (a1), a local frequency (fa), and computing LT1=a1/fa, the CS1 sending a query to a second computing system (CS2), the CS1 receiving a response from the CS2 which includes a timestamp from the CS2 (T1), the CS1 determining a second local timestamp (LT2) for the receipt of the response, determining a latency from the LT1 and LT2, and determining an offset measurement for the CS1 and CS2 using the latency, the LT1, and the T1; and determining an offset for CS1 and CS2 by calculating the statistical mode of the plurality of offset measurements;

calculating a ratio using the offset (O1), at least one later determined offset (O2), and an elapsed time (ET) between the offset and the at least one later determined offset to determine one or more time measurement drifts between machines, the one or more time measurement drifts measuring the rate of change of a local clock in CS1 relative to the rate of change in another local clock in CS2 and being determined by the ratio (O2−O1)/ET;

determining whether the calculated time measurement drifts are stable by comparing one or more additional calculated time measurement drifts; and changing time stamps to compensate for the offset and time measurement drifts.

* * * * *